United States Patent
Ho et al.

(10) Patent No.: US 8,290,428 B2
(45) Date of Patent: Oct. 16, 2012

(54) METHODS AND APPARATUS FOR RLC RE-TRANSMISSION SCHEMES

(75) Inventors: Sai Yiu Duncan Ho, San Diego, CA (US); Etienne F. Chaponniere, Rome (IT)

(73) Assignee: QUALCOMM Incorporated, San Diego, CA (US)

( * ) Notice: Subject to any disclaimer, the term of this patent is extended or adjusted under 35 U.S.C. 154(b) by 863 days.

(21) Appl. No.: 11/949,607

(22) Filed: Dec. 3, 2007

(65) Prior Publication Data

US 2008/0139113 A1    Jun. 12, 2008

Related U.S. Application Data

(60) Provisional application No. 60/868,859, filed on Dec. 6, 2006, provisional application No. 60/883,920, filed on Jan. 8, 2007, provisional application No. 60/884,163, filed on Jan. 9, 2007.

(51) Int. Cl.
*H04B 3/36* (2006.01)

(52) U.S. Cl. ............ 455/7; 455/24; 455/67.11; 455/447

(58) Field of Classification Search ................ 455/7, 14, 455/15, 24, 67.11, 67.13, 67.16, 69, 447, 455/452.1, 458, 455; 370/348, 329, 389
See application file for complete search history.

(56) References Cited

U.S. PATENT DOCUMENTS

| | | | |
|---|---|---|---|
| 6,693,892 B1 * | 2/2004 | Rinne et al. | 370/348 |
| 7,039,406 B2 | 5/2006 | Ishiguro et al. | |
| 2002/0019232 A1 * | 2/2002 | Balachandran et al. | 455/445 |
| 2002/0071407 A1 * | 6/2002 | Koo et al. | 370/335 |
| 2004/0052250 A1 * | 3/2004 | Hu et al. | 370/389 |
| 2007/0079207 A1 | 4/2007 | Seidel et al. | |

FOREIGN PATENT DOCUMENTS

| | | |
|---|---|---|
| EP | 1398897 | 3/2004 |
| EP | 1507352 | 2/2005 |
| JP | 2002271442 A | 9/2002 |
| JP | 2004135301 A | 4/2004 |
| JP | 2007028653 A | 2/2007 |

(Continued)

OTHER PUBLICATIONS

Wang, et al.: "Gap-processing Time Analysis of Stall Avoidance Mechanisms for High Speed Downlink Packet Access with Parallel HARQ Schemes," 2005 International Conference on Wireless Networks, Communications and Mobile Computing, vol. 1, pp. 81-86, Jun. 13-16, 2005.

(Continued)

*Primary Examiner* — John J Lee
(74) *Attorney, Agent, or Firm* — Nerrie M. Zohn

(57) ABSTRACT

A method includes sending to a receiving device from a transmitting device a Radio Link Control (RLC) re-transmission scheme selected from a plurality of RLC re-transmission schemes, and using the selected and sent scheme at least at one of the receiving device and the transmitting device. In another exemplary non-limiting embodiment the method includes detecting, at the receiver, a gap in RLC Protocol Data Unit (PDU) sequence numbers, associating a timer with the gap, and starting the timer when the gap is detected. In still another exemplary non-limiting embodiment, the method includes detecting a gap in a RLC PDU sequence, monitoring a HARQ channel for a period of time to determine if a predetermined bit has changed, and determining if a transmission is lost.

8 Claims, 10 Drawing Sheets

FOREIGN PATENT DOCUMENTS

| | | |
|---|---|---|
| RU | 2216867 | 11/2003 |
| WO | WO98058469 | 12/1998 |
| WO | 99/07170 | 2/1999 |
| WO | 03034643 | 4/2003 |
| WO | WO03032564 | 4/2003 |

OTHER PUBLICATIONS

Zhang, et al.: "Performance of UMTS Radio Link Control," IEEE International Conference on Communications, 2002, ICC 2002, vol. 5, pp. 3346-3350, XP010590089, ISBN: 978-0-7803-7400-3. Apr. 28-May 2, 2002.
Partial International Search Report—PCT/US2007/086412, International Searching Authority—European Patent Office—Jul. 14, 2008.
International Search Report—PCT/US2007/086412, International Searching Authority—European Patent Office—Oct. 22, 2008.
Written Opinion—PCT/US2007/086412, International Searching Authority—European Patent Office—Oct. 22, 2008.
Qualcomm: "Enhancements to Stall Avoidance mechanism" 3GPP Draft; R2-021590 Stall Avoidance Discussion, 3RD Generation Partnership Project (3GPP). Mobile Competence Centre : I I 650, Route Des Lucioles ; F-06921.
Sophia-Antipolis Cedex: France. 1 vol. RAN WG2, No. Turin; Italy; 20020621, Jun. 21, 2002, XP050121152.
Taiwan Search Report—TW096146541—TIPO—Jun. 8, 2011.

* cited by examiner

METHODS AND APPARATUS FOR RLC RE-TRANSMISSION SCHEMES

CROSS-REFERENCE TO RELATED APPLICATIONS

This: application claims the benefit of U.S. Provisional Patent application Ser. No. 60/868,859 entitled "A METHOD AND APPARATUS FOR PROVIDING RE-ORDERING INDICATION" which was filed Dec. 6, 2006. This application also claims the benefit of U.S. Provisional Patent application Ser. No. 60/883,920 entitled "RLC PDU RE-ORDERING INDICATION" which was filed Jan. 8, 2007, and U.S. Provisional Patent application Ser. No. 60/884,163 entitled "A METHOD AND APPARATUS FOR PROVIDING RE-ORDERING INDICATION" which was filed Jan. 9, 2007. The entireties of the aforementioned applications are herein incorporated by reference.

BACKGROUND

I. Field

The following description relates generally to wireless communications, and more particularly to methods and apparatus for Radio Link Control (RLC) layer re-transmission schemes and their selection.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, 3GPP LTE systems, orthogonal frequency division multiplexing (OFDM), localized frequency division multiplexing (LFDM), orthogonal frequency division multiple access (OFDMA) systems, and the like.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into Ns independent channels, which are also referred to as spatial channels, where $N_S \leq \min\{N_T, N_R\}$. Each of the Ns independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beam forming gain on the forward link when multiple antennas are available at the access point.

In a wireless communication system, a Node B (or base station) may transmit data to a user equipment (UE) on the downlink and/or receive data from the UE on the uplink The downlink (or forward link) refers to the communication link from the Node B to the UE, and the uplink (or reverse link) refers to the communication link from the UE to the Node B. The Node B may also send control information (e.g., assignments of system resources) to the UE. Similarly, the UE may send control information to the Node B to support data transmission on the downlink and/or for other purposes.

Previously protocol data units (PDUs) have been transmitted in order. Now a hybrid automatic retransmission request (HARQ) layer uses multiple transmission paths and the PDUs are not always transmitted in order. Additionally, the HARQ layer and the RLC layer do not directly talk to each other. The RLC layer will wish to send protocol data units (PDUs). The HARQ layer will actually transmit the PDUs via multiple channels. However, the RLC layer does not currently with multiple paths know that all the PDUs were actually received. Therefore, there is a need for the RLC layer to know when to re-transmit PDUs.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with an exemplary non-limiting embodiment, a method includes sending to a receiving device from a transmitting device a Radio Link Control (RLC) re-transmission scheme selected from a plurality of RLC re-transmission schemes, and using the selected and sent scheme at least at one of the receiving device and the transmitting device. In another exemplary non-limiting embodiment the method includes detecting, at the receiver, a gap in RLC Protocol Data Unit (PDU) sequence numbers, associating a timer with the gap, and starting the timer when the gap is detected. In still another exemplary non-limiting embodiment, the method includes detecting a gap in a RLC PDU sequence, monitoring a HARQ channel for a period of time to determine if a pre-determined bit has changed, and determining if a transmission is lost.

In accordance with an exemplary non-limiting embodiment, the plurality of re-transmission schemes includes at least one receiver side scheme and one transmitter side scheme. In accordance with an exemplary non-limiting embodiment, provided herein are means for detecting, at a Radio Link Control (RLC) receiver, a gap in RLC Protocol Data Unit (PDU) sequence numbers, means for associating a timer with the gap, and means for starting the timer when the gap is detected. In accordance with an exemplary non-limiting embodiment, a method used in a wireless communication system includes detecting, at a Radio Link Control (RLC) receiver, a gap in RLC Protocol Data Unit (PDU) sequence numbers, associating a timer with the gap, and starting the timer when the gap is detected.

In accordance with yet another exemplary non-limiting embodiment, a computer-readable medium includes code for detecting, at a Radio Link Control (RLC) receiver, a gap in RLC Protocol Data Unit (PDU) sequence numbers, code for associating a timer with the gap, and code for starting the timer when the gap is detected. In accordance with an exemplary non-limiting embodiment, a method used in wireless communication system includes detecting a gap in a RLC PDU sequence, monitoring a HARQ channel for a period of time to determine if a predetermined bit has changed, and determining if a transmission is lost. The method can include receiving a Radio Link Control (RLC) re-transmission scheme selected from a plurality of RLC re-transmission schemes. The method can include transmitting to a user equipment (UE), a Radio Link Control (RLC) retransmission scheme selected from a plurality of RLC re-transmission schemes.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
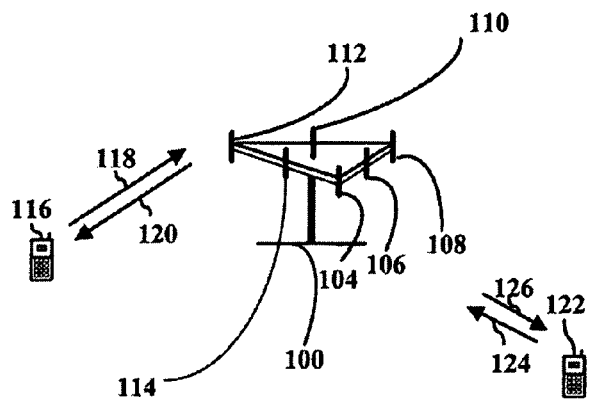
FIG. 1 illustrates a wireless communication system in accordance with various aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

In accordance with an exemplary non-limiting embodiment, a method includes sending to a receiving device from a transmitting device a Radio Link Control (RLC) re-transmission scheme selected from a plurality of RLC re-transmission schemes, and using the selected and sent scheme at least at one of the receiving device and the transmitting device. In another exemplary non-limiting embodiment the method includes detecting, at the receiver, a gap in RLC Protocol Data Unit (PDU) sequence numbers, associating a timer with the gap, and starting the timer when the gap is detected. In still another exemplary non-limiting embodiment, the method includes detecting a gap in a RLC PDU sequence, monitoring a HARQ channel for a period of time to determine if a predetermined bit has changed, and determining if a transmission is lost.

In accordance with an exemplary non-limiting embodiment, the plurality of re-transmission schemes includes at least one receiver side scheme and one transmitter side scheme. In accordance with an exemplary non-limiting embodiment, provided herein are means for detecting, at a Radio Link Control (RLC) receiver, a gap in RLC Protocol Data Unit (PDU) sequence numbers, means for associating a timer with the gap, and means for starting the timer when the gap is detected. In accordance with an exemplary non-limiting embodiment, a method used in a wireless communication system includes detecting, at a Radio Link Control (RLC) receiver, a gap in RLC Protocol Data Unit (PDU) sequence numbers, associating a timer with the gap, and starting the timer when the gap is detected.

In accordance with yet another exemplary non-limiting embodiment, a computer-readable medium includes code for detecting, at a Radio Link Control (RLC) receiver, a gap in RLC Protocol Data Unit (PDU) sequence numbers, code for associating a timer with the gap, and code for starting the timer when the gap is detected. In accordance with an exemplary non-limiting embodiment, a method used in wireless communication system includes detecting a gap in a RLC PDU sequence, monitoring a HARQ channel for a period of time to determine if a predetermined bit has changed, and determining if a transmission is lost. The method can include receiving a Radio Link Control (RLC) retransmission scheme selected from a plurality of RLC re-transmission schemes. The method can include transmitting to a user equipment (UE), a Radio Link Control (RLC) re-transmission scheme selected from a plurality of RLC re-transmission schemes.

In addition, various aspects of the disclosure are described below. It should be apparent that the teaching herein may be embodied in a wide variety of forms and that any specific structure and/or function disclosed herein is merely representative. Based on the teachings herein one skilled in the art should appreciate that an aspect disclosed herein may be implemented independently of any other aspects and that two or more of these aspects may be combined in various ways. For example, an apparatus may be implemented and/or a method practiced using any number of the aspects set forth herein. In addition, an apparatus may be implemented and/or a method practiced using other structure and/or functionality in addition to or other than one or more of the aspects set forth herein. As an example, many of the methods, devices, systems, and apparatuses described herein are descried in the context of an ad-hoc or unplanned/semi-planned deployed wireless communication environment that provides repeating ACK channel in an orthogonal system. One skilled in the art should appreciate that similar techniques could apply to other communication environments.

As used in this application, the terms "component," "system," and the like are intended to refer to a computer-related entity, either hardware, software, software in execution, firmware, middle ware, microcode, and/or any combination thereof. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein may be rearranged and/or complemented by additional components in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a subscriber station. A subscriber station can also be called a system, a subscriber unit, mobile station, mobile, remote station, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels, and various other media capable of storing, containing, and/or carrying instruction(s) and/or data.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

The scheme selection techniques described herein may be used for various wireless communication systems such as CDMA, TDMA, FDMA, OFDMA, and SC-FDMA systems. The terms "system" and "network" are often used interchangeably. A CDMA system may implement a radio technology such as Universal Terrestrial Radio Access (UTRA), cdma2000, etc. UTRA includes Wideband CDMA (W-CDMA) and Low Chip Rate (LCR). Cdma2000 covers. IS-2000, IS-95, and IS-856 standards. A TDMA system may implement a radio technology such as Global System for Mobile Communications (GSM). An OFDMA system may implement a radio technology such as Evolved UTRA (E-UTRA), IEEE 802.11, IEEE 802.16, IEEE 802.20, Flash-OFDMO, etc. These various radio technologies and standards are known in the art.

UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS, and LTE are described in documents from an organization named "3rd Generation Partnership Project" (3GPP). Cdma2000 is described in documents from an organization named "3rd Generation Partnership Project 16" (3GPP2). For clarity, certain aspects of the techniques are described below for downlink transmission in LTE, and 3GPP terminology is used in much of the description below.

LTE utilizes orthogonal frequency division multiplexing (OFDM) on the downlink and single-carrier frequency division multiplexing (SC-FDM) on the uplink. OFDM and SC-FDM partition the system bandwidth into multiple (N) orthogonal subcarriers, which are also commonly referred to as tones, bins, etc. Each subcarrier may be modulated with data. In general, modulation symbols are sent in the frequency domain with OFDM and in the time domain with SC-FDM. For LTE, the spacing between adjacent subcarriers may be fixed, and the total number of subcarriers (N) may be dependent on the system bandwidth. In one design, N=512 for a system bandwidth of 5 MHz, N=1024 for a system bandwidth of 10 MHz, and N=2048 for a system bandwidth of 20 MHz. In general, N may be any integer value.

The system may support a frequency division duplex (FDD) mode and/or a time division duplex (TDD) mode. In the FDD mode, separate frequency channels may be used for the downlink and uplink, and downlink transmissions and uplink transmissions may be sent concurrently on their separate frequency channels. In the TDD mode, a common frequency channel may be used for both the downlink and uplink, downlink transmissions may be sent in some time periods, and uplink transmissions may be sent in other time periods. The LTE downlink transmission scheme is partitioned by radio frames (e.g. 10 ms radio frame). Each frame comprises a pattern made of frequency (e.g. sub-carrier) and time (e.g. OFDM symbols). The 10 ms radio frame is divided into plurality of adjacent 0.5 ms sub-frames (also referred to as sub-frames or timeslots and interchangeably used hereinafter). Each sub-frame comprises plurality of resource blocks, wherein each resource block made up of one or more sub-carrier and one or more OFDM symbol. One or more resource blocks may be used for transmission of data, control information, pilot, or any combination thereof.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. Access terminals 116 and 122 can be UEs. In a FDD system, communication links 118, 120, 124, and 126 may use different frequency for communication. For example, forward link 120 may use a different frequency than that used by reverse: link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beam forming in order to improve the signal-to-noise ratio of forward links for the different access terminals 116 and 124. Also, an access point using beam forming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal, or some other terminology.

Figure 2:
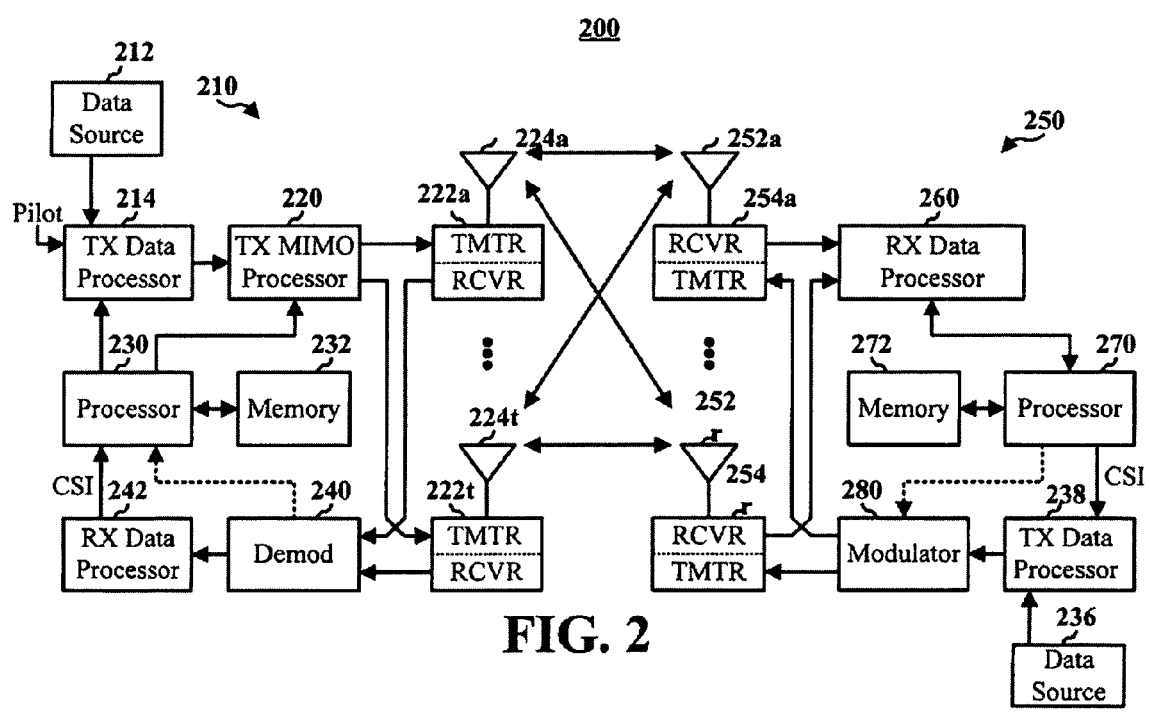
FIG. 2 depicts an example communications apparatus for employment with a wireless communications environment in accordance with one or more aspects.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using FORM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BASK, ASK, M-PSF, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beam-forming weights to the symbols of the data streams and to the antenna from which the symbol is being transmitted.

Each transmitter 222 receives and processes a respective symbol stream to provide one or more analog signals, and further conditions (e.g., amplifies, filters, and up converts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210. A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which precoding matrix to use for determining the beam forming weights then processes the extracted message.

In an aspect, logical channels are classified into Control Channels and Traffic Channels. Logical Control Channels comprises Broadcast Control Channel (BCCH) that is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing a Radio Resource Control (RRC) connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprise a Dedicated Traffic Channel (DTCH) that is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH), and plurality of PHY channels. The PHY channels comprise a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low signal peak to average (PAR) values, and at any given time, the channel is contiguous or uniformly spaced in frequency that is a desired property of a single carrier waveform.

While, for purposes of simplicity of explanation, the methodologies are shown and described as a series of acts, it is to be understood and appreciated that the methodologies are not limited by the order of acts, as some acts may, in accordance with the claimed subject matter, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

Figure 3:
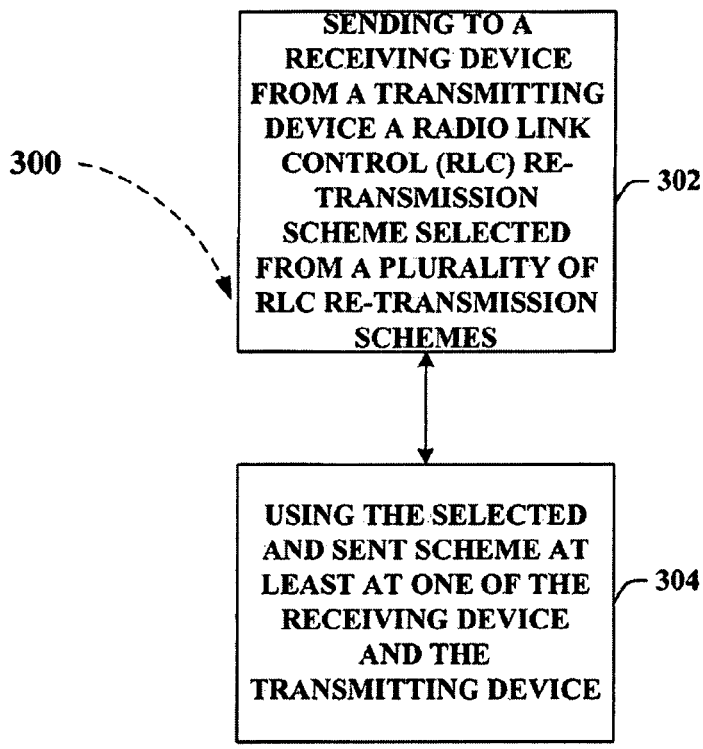
FIG. 3 illustrates a methodology including sending to a receiving device from a transmitting device a Radio Link Control (RLC) re-transmission scheme selected from a plurality of RLC re-transmission schemes in accordance with one or more aspects.

FIG. 3 illustrates a methodology 300 including, at act 302 sending to a receiving device from a transmitting device a Radio Link Control (RLC) re-transmission scheme selected from a plurality of RLC re-transmission schemes, and at act 302 using the selected and sent scheme at least at one of the receiving device and the transmitting device. The sending and using are typically temporally connected tin that the using immediately follows the sending. However, that is not necessary and the two events can be temporally disconnected. Additionally, it is contemplated that the sending would be done wirelessly, the benefits of the innovation accrue to embodiment where the sending is not done wirelessly. As detailed below the schemes include both receiver based schemes and transmitter based schemes.

In Long Term Evolution (LTE), Radio Link Control (RLC) Protocol Data Units (PDUs) may be delivered out-of-sequence due to Hybrid Automatic Repeat-reQuest (HARQ). In LTE, the RLC layer uses the HARQ layer to transmit the RLC PDUs. Since the HARQ layer uses multiple HARQ channels for transmission in parallel, the RLC PDUs may be delivered out-of-order at the receiving C. Even though there is a re-ordering buffer at the RLC receiver to re-order the RLC PDUs received from different HARQ channels, when there is a "gap" in the received RLC PDU sequence numbers, the receiver cannot immediately conclude that those PDUs corresponding to the "gap" are missing since they may still be in the process of delivery at the HARQ layer.

As a result, some RLC PDUs that have not been, received may appear missing when they are in fact still being delivered by the HARQ. Thus, the receiving RLC may not send an RLC Nak (negative acknowledgment) to correct the problem immediately.

Then, the problem becomes how the receiving RLC determines the RLC PDUs are truly missing so that it may send an RLC Nak to request for retransmission. There are at least two schemes to solve this problem.

Scheme 1

In an aspect, rely on HARQ and do not rely on RLC Nak at all. The transmitting HARQ indicates to the transmitting RLC whether the RLC PDU(s) have been delivered successfully by the HARQ layer. There are two cases where the HARQ could fail the delivery:

1) The maximum number of HARQ retransmissions is reached and the encoder packet is still not decoded correctly.

2) An HARQ Nak has been falsely detected as an Ack at the HARQ transmitter.

Under the first scheme, HARQ is completely relied on, and RLC Nak is not counted on at all. The transmitting HARQ may notify the transmitting RLC that the RLC PDUs was not delivered, and the transmitting RLC may then initiate an RLC retransmission without any RLC Nak. The transmitting HARQ indicates to the transmitting RLC whether the RLC PDU(s) have been delivered successfully by the HARQ layer. There are two cases where the HARQ may fail the delivery set forth above and it is envisioned that by allowing such indication, the transmitting RLC entity can detect a RLC PDU(s) transmission failure and hence it can resubmit the same RLC PDU(s) to the HARQ layer for new transmission without waiting for the receiving RLC to detect the failure. This scheme is currently agreed upon in the LTE standard. The drawback of this scheme is it fails to cover case 2) above. In order to cover case 2), extra over-the-air overhead is needed, which is not agreed upon.

Scheme 2

Under the second scheme, the receiving RLC detects whether the RLC PDUs are truly missing by monitoring the activities of the HARQ channels. Once a "gap" in the RLC PDU sequence number occurs at the receiver, the receiving RLC monitors the subsequent activities of the HARQ channels (e.g., the "new packet indicator" changes on an HARQ channel) and derives that it is impossible that the missing PDUs are still being retransmitted by the HARQ (i.e., the RLC PDUs corresponding to the "gap" are indeed lost). The HARQ uses the "new packet indicator" (toggles it between '0' and '1' when a new encoder packet is sent) to distinguish between a newly transmitted encoder packet and a retransmitted encoder packet so the receiving HARQ knows whether to combine the received encoder packets with any previous copies received. Once the missing PDUs are detected, the RLC sends an RLC Nak to the RLC transmitter to request for retransmission. This scheme is currently being considered in the LTE standard. The appeal of this scheme is that it does not need extra over-the-air overhead and it covers both case 1) and case 2) above.

Either of the foregoing-described schemes works on their own independently (with different efficiency). However, with the first scheme active, the retransmitted RLC PDUs may cause the "new packet indicator" to change, and the RLC receiver can no longer make the same conclusion.

Thus, it is desirable for the transmitting side to indicate to the receiving side which scheme the receiving side should expect or perform under. In certain aspects of the present disclosure, an indication (e.g., in the form of a RLC configuration message when setting up DL RLC) may be transmitted from the transmitting side to the receiving side, where the indication indicates which scheme the receiver should perform under or expect.

If the system decides to use the first scheme but not the second scheme, a HARQ Nak to Ack error may not be detected by the HARQ. As a result, the RLC transmitter may think the corresponding RLC PDUs in the encoder packet were received successfully when in fact they were not. To address this problem, in certain aspects of the present disclosure, it is proposed to associate a timer with the "gap" detected at the RLC receiver. The timer may be started whenever the "gap" is detected and it may expire either when the "gap" is filled or when a fixed time is reached. The fixed time value may be adjusted based on the delay requirement (e.g., stringent delay requirement means smaller timer). For example, if the delay requirement for RLC is 100 ms (measured from the point SAP of RLC transmitter to the SAP of the RLC receiver, including all delays incurred by HARQ and RLC retransmissions), the timer may be set to, say, 54 ms. However, if the timer is too small, unnecessary RLC retransmissions may be created. If the timer is too big, the retransmitted RLC PDUs may not meet the delay requirement. This timer may be set by the eNode B (based on the delay requirement) and signaled to the UE (per RLC flow), or it may be adaptively computed if the UE knows the delay requirements.

Which of the foregoing-described scheme is better depends on whether the network implements the first scheme. If the first scheme is used, the best strategy is to use a timer in the RLC receiver as described above. This combo would give reasonable performance with minimal complexity at the receiver. The reason is illustrated as follows.

Assume:
P[$1^{st}$ HARQ tx decoded successfully]=0.8
P[$2^{nd}$ HARQ tx decoded successfully]=0.99
P[HARQ Nak->Ack]=$10^{-2}$
Then, P[$1^{st}$ tx failed and Nak->Ack]=$(1-0.8)*10^{-2} \sim 10^{-3}$ Thus, the first scheme may fail $10^{-3}$ or 0.1% of the time. Therefore, only 0.1% of the time, the timer may be relied upon to recover. The "P[2nd tx decoded successful]" is here to show that the number is small and therefore, all the computations follow are reasonable estimates (as opposed to exact numbers). E.g., another NAK->ACK misdetection scenario is not addressed. 1st tx failed AND 2nd tx failed AND NAK is detected as ACKed. However, the probability will be so small due to P[2nd tx successful] being 0.99.

However, if the first scheme is not used by the network, then the second scheme is desired since it does not require any over-the-air overhead.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium in the alternative, the storage medium may be integral to the processor. The processor and the storage medium may reside in an ASIC. The ASIC may reside in a user terminal. In the alternative, the processor and the storage medium may reside as discrete components in a user terminal.

The herein description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Figure 4:
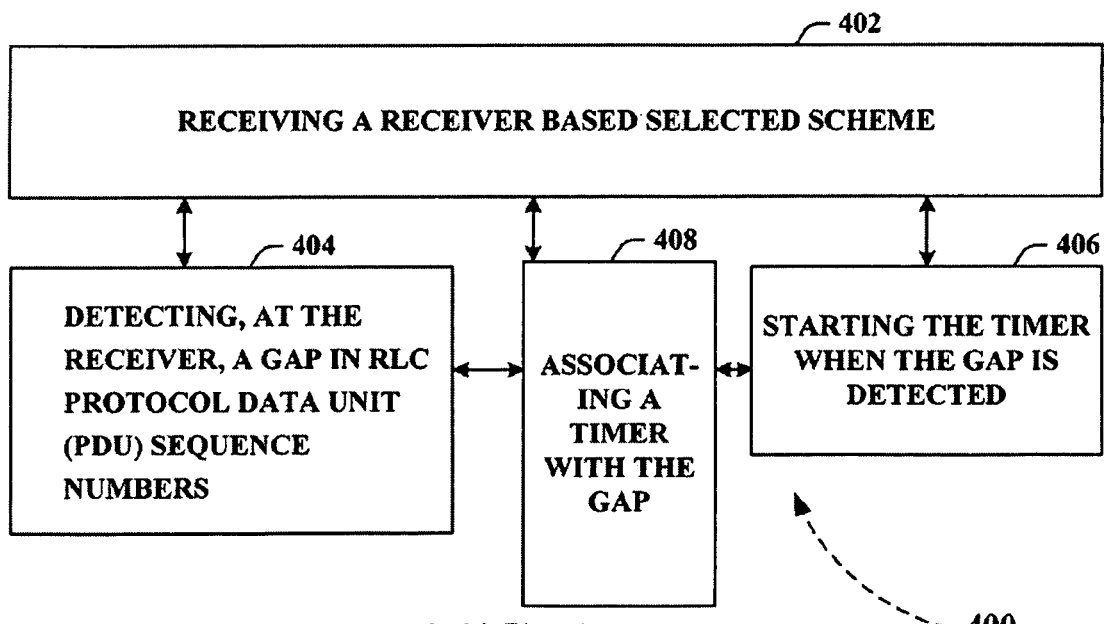
FIG. 4 illustrates a methodology where the schemes include receiver based schemes and the method includes receiving a receiver based selected scheme in accordance with one or more aspects.

FIG. 4 illustrates a methodology 400 where the schemes include receiver based schemes and at act 402 method 400 includes receiving a receiver based selected scheme. At act 404 is detecting, at the receiver, a gap in RLC Protocol Data Unit (PDU) sequence numbers. At act 406 is starting the timer when the gap is detected, and at act 408 is associating a timer with the gap. Accordingly, when the timer goes off, the receiver determines the gap is such that data is lost and needs to be re-transmitted. The receiver then asks the transmitter to resend or re-transmit the lost data. Method 400 is a receiver based method because the receiver determines when data is missing. For example, a node-B sends a mobile phone an indication that the scheme will be a receiver based scheme, and then the mobile phone knows that it (the mobile phone) is responsible for tracking whether communications were successful or if re-transmissions are desired. The node-B can also tell the mobile phone what specific receiver based scheme to use. Alternatively, the node-B does not tell the mobile phone what specific receiver based scheme to use and the mobile phone selects itself what specific receiver based scheme to use.

Figure 5:
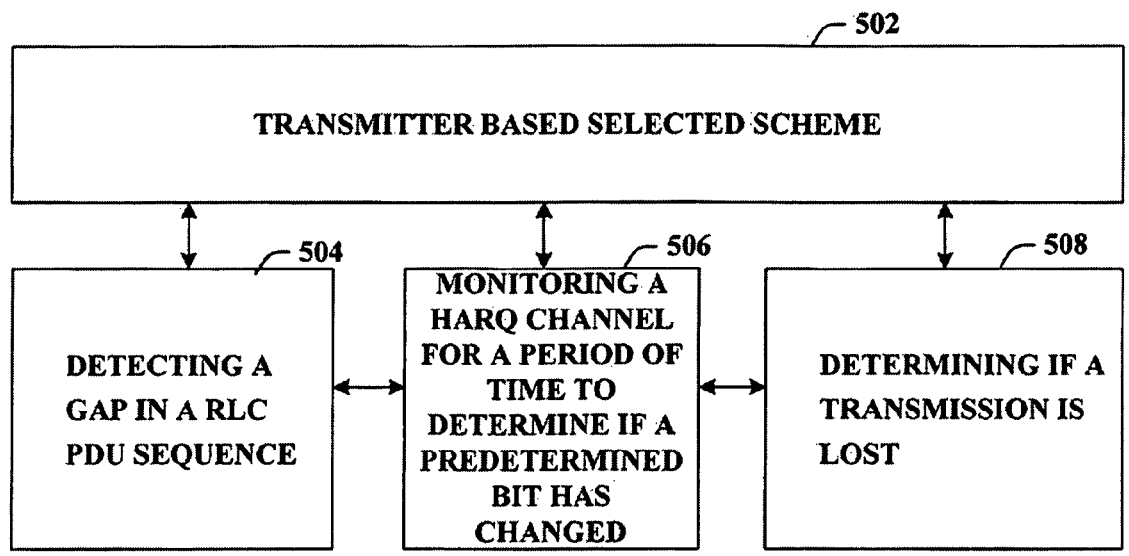
FIG. 5 illustrates a methodology where the schemes include transmitter based schemes and the method includes receiving a transmitter based selected scheme in accordance with one or more aspects.

FIG. 5 illustrates a methodology 500 where the schemes include transmitter based schemes and at act 502 method 500 includes receiving a transmitter based selected scheme. At act 504 is detecting a gap in RLC Protocol Data Unit (PDU) sequence numbers. At act 506 is monitoring a HARQ channel for a period of time to determine if a predetermined bit has changed. At act 508 is determining if a transmission is lost. Method 500 is a transmitter based method because the transmitter determines when data is missing. In one embodiment, the HARQ bit is a new packet indicator that toggles from 0 to 1 at the start of a new transmission as explained below with reference to FIG. 8. In one exemplary embodiment, instead of using a bit, a byte can be employed. Additionally, other triggering mechanisms can be employed. It can be a count down or a count up timer.

Figure 6:
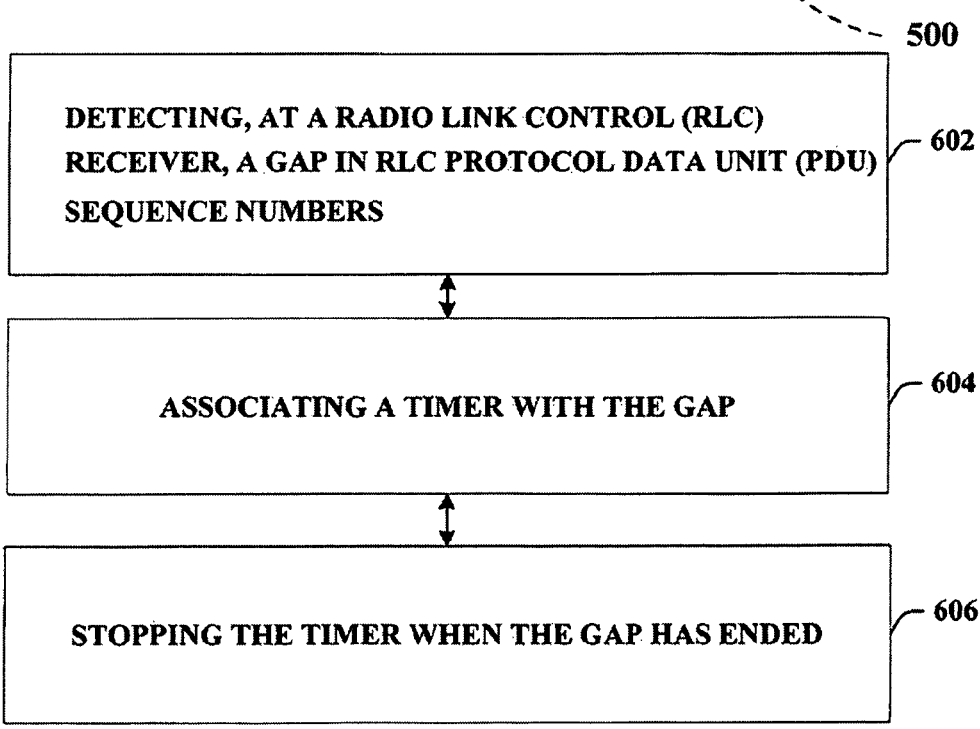
FIG. 6 illustrates a methodology where the schemes include receiver based schemes and the methodology includes detecting, at the RLC receiver, a gap in RLC Protocol Data Unit (PDU) sequence numbers in accordance with one or more aspects.

FIG. 6 illustrates a methodology 600 where the schemes include receiver based schemes and at act 602 is detecting, at the RLC receiver, a gap in RLC Protocol Data Unit (PDU) sequence numbers. At act 604 is associating a timer with the gap. The timer is started, and at act 606 the timer is stopped when the gap has ended. Method 600 illustrates the example of the data being delayed but not lost. Method 600 is a receiver based method because the receiver determines when data is missing. In this case, no data was missing and no re-transmission is desired. For an example where data is missing, the timer is started (either a count up or a count down timer) and when the threshold value is reached and the gap still existing, the decision is that a re-transmission needs to be performed and the receiver (a mobile phone for example) tells the node-B to re-transmit.

Figure 7A:
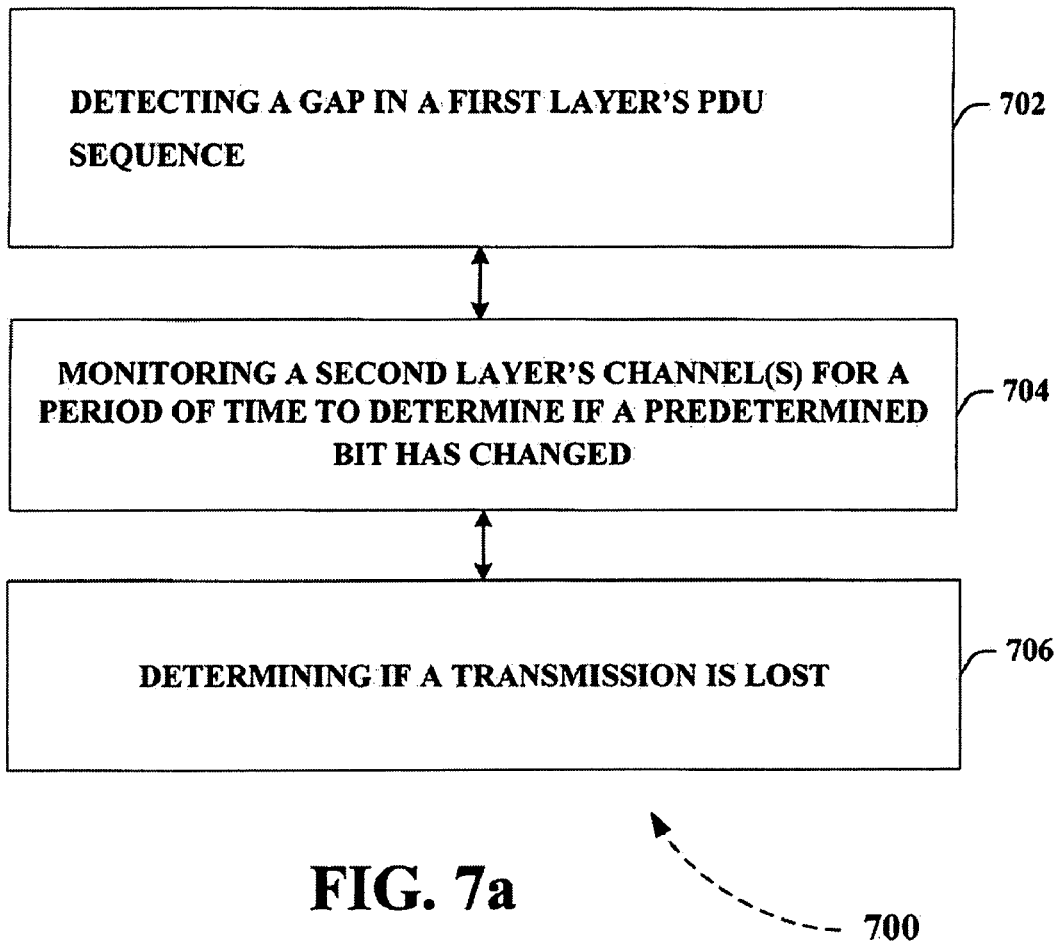
FIG. 7a illustrates a methodology where the schemes include transmitter based schemes and the method includes detecting a gap in first layer's PDU sequence numbers in accordance with one or more aspects.

FIG. 7a illustrates a methodology 700 where the schemes include transmitter based schemes and at act 702 method 700 includes detecting a gap in first layer's PDU sequence numbers. At act 704 is monitoring a second layer's channel for a period of time to determine if a predetermined bit has changed. At act 706 is determining if a transmission is lost. Method 700 is a transmitter based method because the transmitter determines when data is missing. For example, the first layer can be an RLC layer and can initiate a transmission through a second layer's channel(s) such as for example but not limited to a HARQ layer. The HARQ channel can include a bit such as a new packet indicator that is toggled between transmissions. If the bit is toggled on all channels and there is missing data then it can be assumed that the missing data is lost and a re-transmission is desired.

Figure 7B:
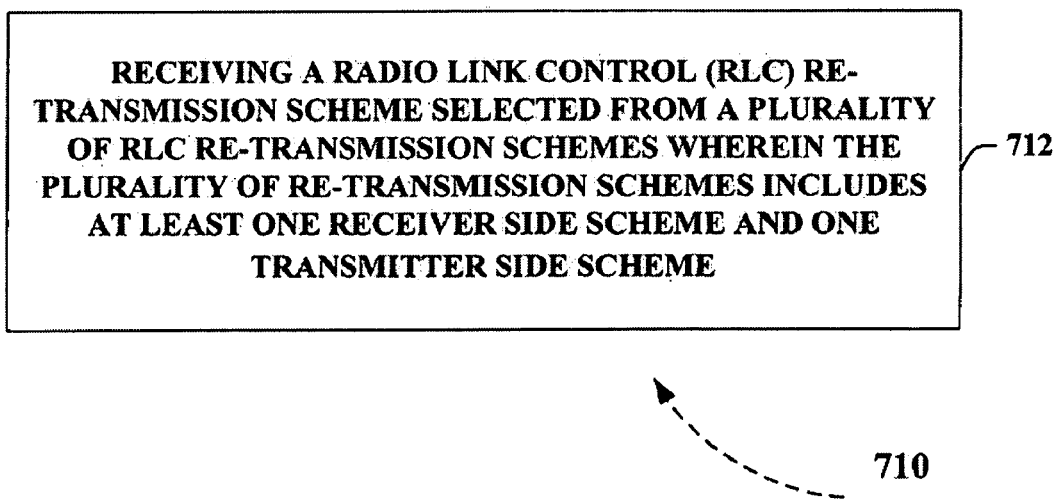
FIG. 7b illustrates a methodology as experienced from a UE perspective in accordance with one or more aspects.

FIG. 7b illustrates a methodology 710 as experienced from a UE perspective. At act 712 is receiving a Radio Link Control (RLC) re-transmission scheme selected from a plurality of RLC re-transmission schemes wherein the plurality of re-transmission schemes includes at least one receiver side scheme and one transmitter side scheme. For example, the mobile device such as a mobile phone can receive RLC re-transmission scheme from a node-B. The node-B can select the scheme from a plurality of RLC re-transmission schemes. The plurality of re-transmission schemes can include at least one receiver side scheme and at least one transmitter side scheme.

Figure 8:
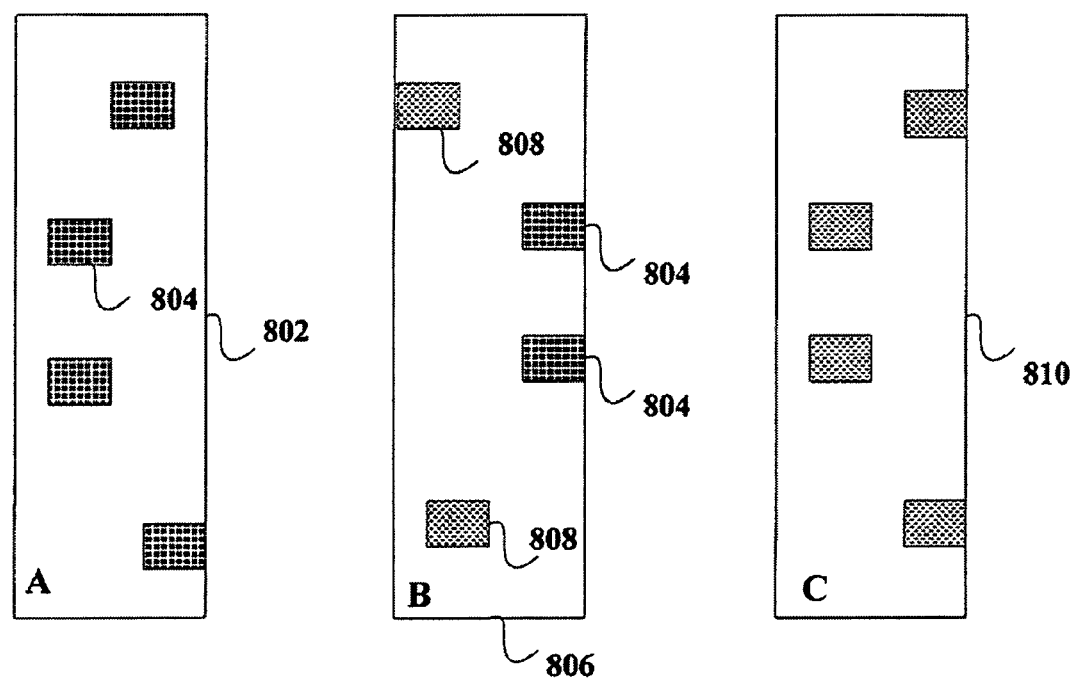
FIG. 8 illustrates a sequence of data states A, B, and C in accordance with one or more aspects.

FIG. 8 illustrates a sequence 800 of data states A, B, and C. At 802 a plurality of blocks 704 are illustrated as moving from left to right to represent data moving from a transmitter to a receiver. The blocks 704 represent a single transmission broken into four pieces. At 706, two blocks (top and bottom) 708 are illustrated differently to show they have a bit change to illustrate the start of a new single transmission. The two central blocks represent channels still transmitting the first single transmission. At 708, all cannels are transmitting the second single transmission and have all had their new packet indicator flipped. For clarity, once a gap is detected, the receiver will monitor the status of EACH HARQ channel since the "outstanding packets" could be being delivered in ANY of these HARQ channels.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, which may be digital, analog, or both digital and analog, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware, or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Figure 9:
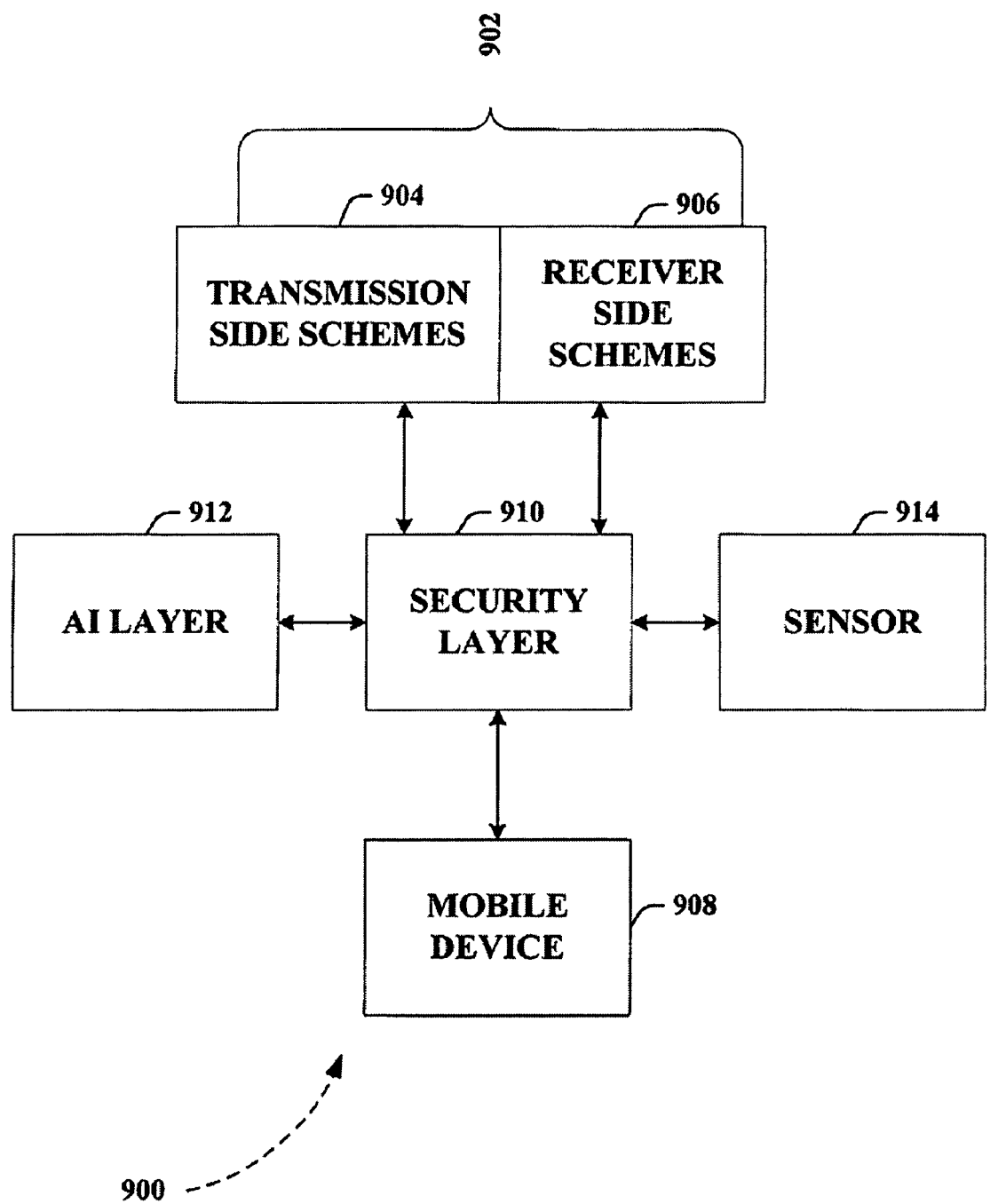
FIG. 9 illustrates a methodology wherein a plurality of re-transmission schemes are available in accordance with one or more aspects.

FIG. 9 illustrates a methodology 900 wherein a plurality of re-transmission schemes are available at 902 including transmission side schemes at 904 and receiver side schemes at 906 for communication to a mobile device at 904. The mobile device is in motion and can be in unsecured areas. Therefore, in one exemplary generalized non-limiting embodiment, the methodology 900 includes employing a security layer at 910. The security layer 910 can determine if the user is authorized to receive the feed or not. The decision of employing a transmission side scheme 904 and/or a receiver side scheme 906 can be made through the employ of an AI layer at 912. A sensor at 914 can provide feedback at to assist in that decision. For example, the sensor can determine network conditions at a specific time and alter the number and/or locations of cells and mobile devices as well as how often RLC PDUs are being re-transmitted and how often the RLC PDUs were being re-transmitted over the last X amount of time. Additionally, statistics regarding re-transmissions any other factor such as mobile device type, manufacturer, modulation scheme employed to aid AI layer 912 in deciding which type(s) of re-transmission schemes 902 to employ.

Because at least a portion of the communication between the device 908 and a network such as a SFN are wireless, the security layer 910 is provided in one exemplary generalized non-limiting embodiment. The security layer 910 can be used to cryptographically protect (e.g., encrypt) data as well as to digitally sign data, to enhance security and unwanted, unintentional, or malicious disclosure. In operation, the security component or layer 910 can communicate data to/from both the SFNs and the mobile device 910.

An encryption component can be used to cryptographically protect data during transmission as well as while stored. The encryption component employs an encryption algorithm to encode data for security purposes. The algorithm is essentially a formula that is used to turn data into a secret code. Each algorithm uses a string of bits known as a 'key' to perform the calculations. The larger the key (e.g., the more bits in the key), the greater the number of potential patterns can be created, thus making it harder to break the code and descramble the contents of the data.

Most encryption algorithms use the block cipher method, which code fixed blocks of input that are typically from 64 to 128 bits in length. A decryption component can be used to convert encrypted data back to its original form. In one aspect, a public key can be used to encrypt data upon transmission to a storage device. Upon retrieval, the data can be decrypted using a private key that corresponds to the public key used to encrypt.

A signature component can be used to digitally sign data and documents when transmitting and/or retrieving from the device 908. It is to be understood that a digital signature or certificate guarantees that a file has not been altered, similar to if it were carried in an electronically sealed envelope. The 'signature' is an encrypted digest (e.g., one-way hash function) used to confirm authenticity of data. Upon accessing the data, the recipient can decrypt the digest and also re-compute the digest from the received file or data. If the digests match, the file is proven to be intact and tamper free. In operation, digital certificates issued by a certification authority are most often used to ensure authenticity of a digital signature.

Still further, the security layer 908 can employ contextual awareness (e.g., context awareness component) to enhance security. For example, the contextual awareness component can be employed to monitor and detect criteria associated with data transmitted to and requested from the device 908. In operation, these contextual factors can be used to filter spam, control retrieval (e.g., access to highly sensitive data from a public network), or the like. It will be understood that, in aspects, the contextual awareness component can employ logic that regulates transmission and/or retrieval of data in accordance with external criteria and factors. The contextual awareness employment can be used in connection with the artificial intelligence (AI) layer 912.

The AI layer or component can be employed to facilitate inferring and/or determining when, where, how to dynamically vary the level of security and/or the amount of echoing. Such inference results in the construction of new events or actions from a set of observed events and/or stored event data, whether or not the events are correlated in close temporal proximity, and whether the events and data come from one or several event(s) and data source(s).

The AI component can also employ any of a variety of suitable AI-based schemes in connection with facilitating various aspects of the herein described innovation. Classification can employ a probabilistic and/or statistical-based analysis (e.g., factoring into the analysis utilities and costs) to prognose or infer an action that a user desires to be automatically performed. The AI layer can be used in conjunction with the security layer to infer changes in the data being transferred and make recommendations to the security layer as to what level of security to apply.

For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

Additionally the sensor 914 can be employed in conjunction with the security layer 910. Still further, human authentication factors can be used to enhance security employing sensor 914. For instance, biometrics (e.g. fingerprints, retinal patterns, facial recognition, DNA sequences, handwriting analysis, voice recognition) can be employed to enhance authentication to control access of the storage vault. It will be understood that embodiments can employ multiple factor tests in authenticating identity of a user.

The sensor 914 can also be used to provide the security layer 910 with generalized non-human metric data, such as electromagnetic field condition data or predicted weather data etc. For example, any conceivable condition can be sensed for and security levels can be adjusted or determined in response to the sensed condition.

Figure 10:
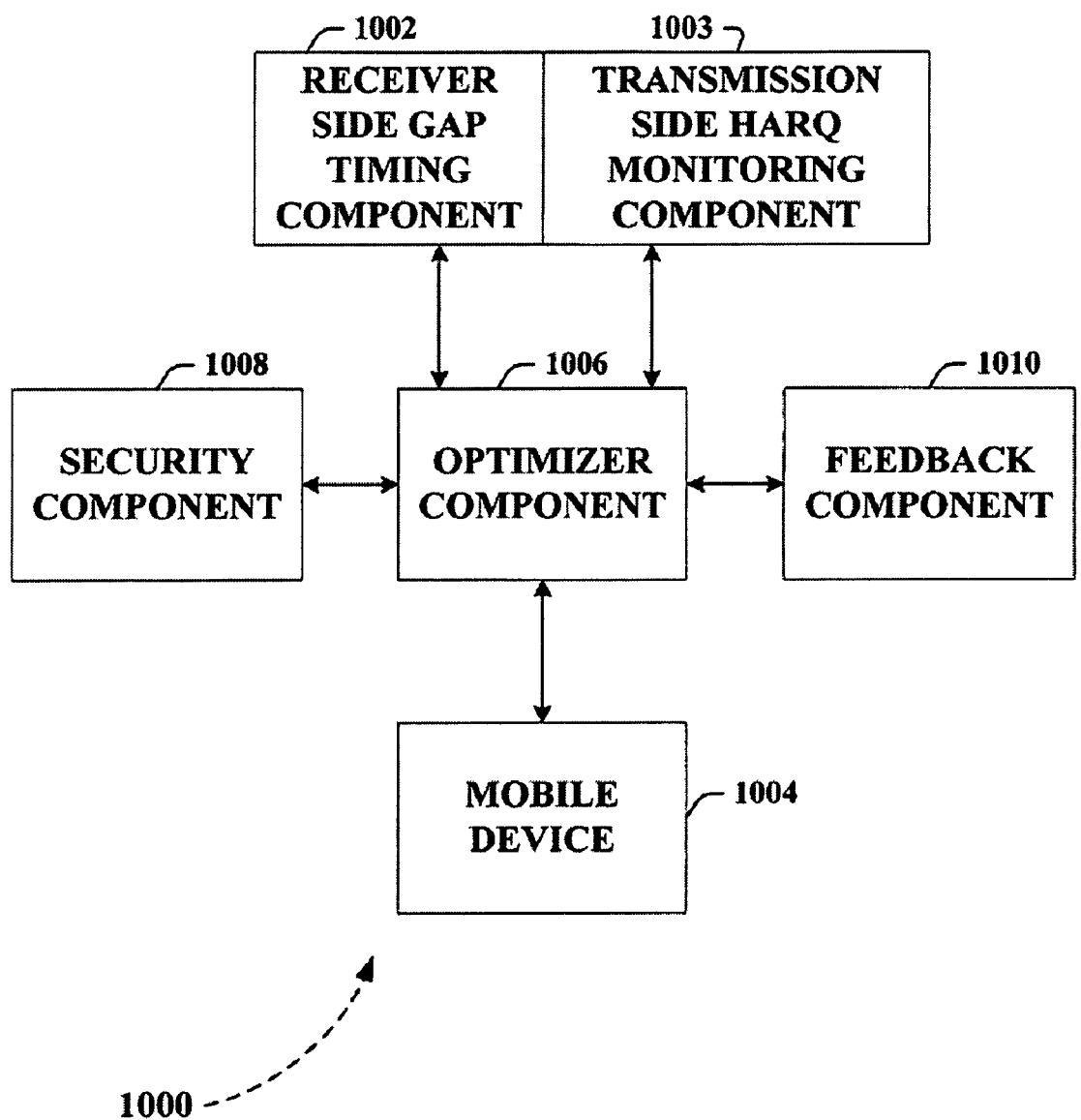
FIG. 10 illustrates an environment wherein a receiver side gap timing component and/or a transmission side HARQ monitoring component is employed with a mobile device and is optimized by an optimizer component in accordance with one or more aspects.

FIG. 10 illustrates an environment 1000 wherein a receiver side gap timing component 1002 and/or a transmission side HARQ monitoring component 1003 is employed with a mobile device 1004 and is optimized by an optimizer component 1006. The optimizer 1006 is provided to optimize communication between the SFNs and device 1004. Optimizer 1006 optimizes or increases communication between the SFNs and device 1004 by receiving security information from a security component 1008. For example, when security layer 1008 informs optimizer 1006 that they are both in a secured environment, the optimizer 1006 balances this information with other information and may instruct the security layer 1008 to make all transmissions security free to achieve top speed. Additionally, a feedback layer or component 1010 can provide feedback as to missed data packets or other information to provide feedback to the optimizer 1006. This feedback of missed packets can be balanced against desired security level to enable less secure but higher throughput data transfer if desired.

Figure 11:
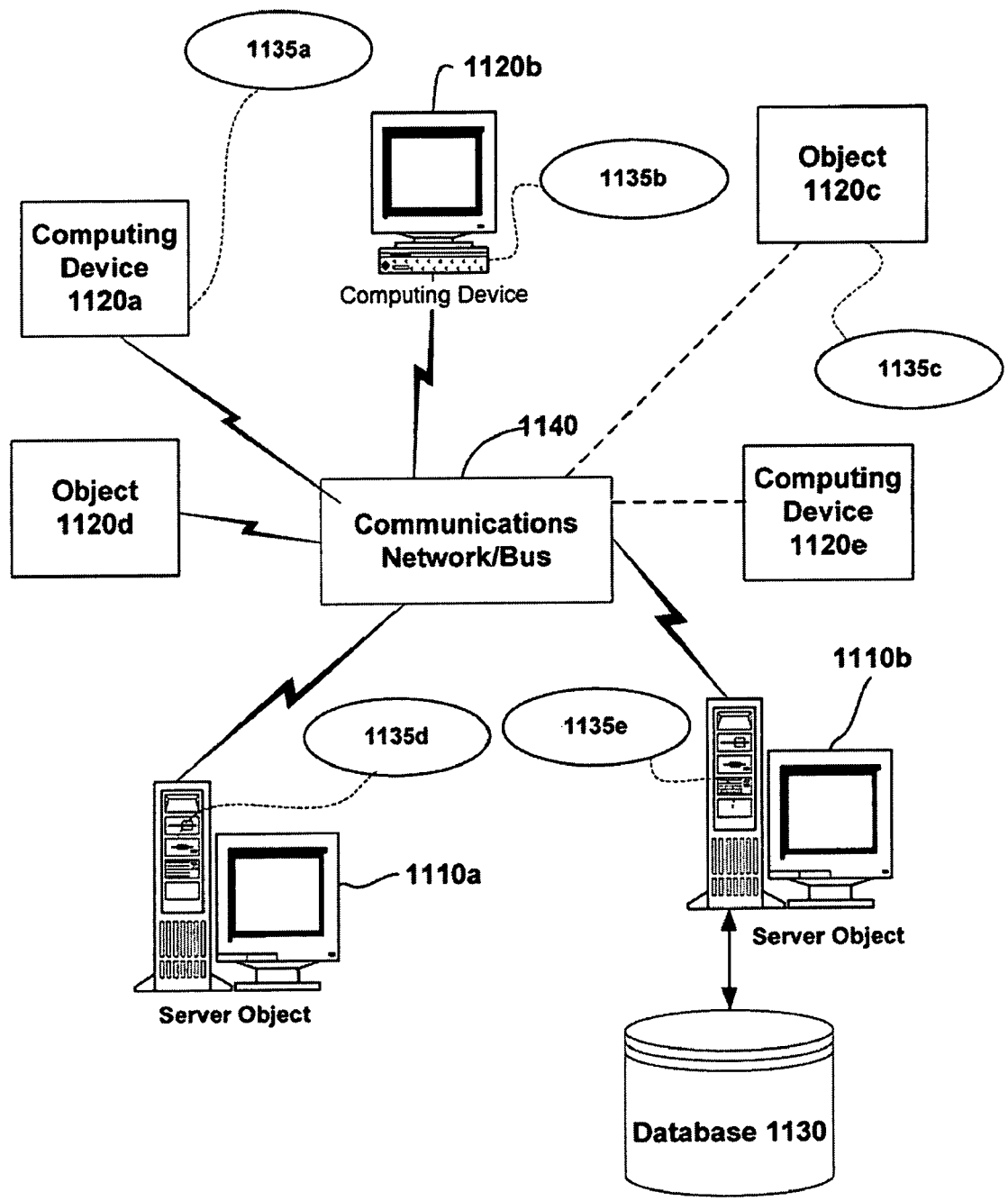
FIG. 11 illustrates an exemplary networked or distributed environment, with server(s) in communication with client computer (s) via a network/bus, in which the present innovation can be employed in accordance with one or more aspects.

FIG. 11 provides a schematic diagram of an exemplary networked or distributed computing environment in which echoing can be employed. The distributed computing environment comprises computing objects 1110*a*, 1110*b*, etc. and computing objects or devices 1120*a*, 1120*b*, 1120*c*, 1120*d*, 1120*e*, etc. These objects can comprise programs, methods, data stores, programmable logic, etc. The objects can comprise portions of the same or different devices such as PDAs, audio/video devices, MP3 players, personal computers, etc. Each object can communicate with another object by way of the communications network 1140. This network can itself comprise other computing objects and computing devices that provide services to the system of FIG. 11, and can itself represent multiple interconnected networks. In accordance with an aspect of at least one generalized non-limiting embodiment, each object 1110*a*, 1110*b*, etc. or 1120*a*, 1120*b*, 1120*c*, 1120*d*, 1120*e*, etc. can contain an application that might make use of an application programming interface (API), or other object, software, firmware and/or hardware, suitable for use with the design framework in accordance with at least one generalized non-limiting embodiment.

It can also be appreciated that an object, such as 1120*c*, can be hosted on another computing device 1110*a*, 1110*b*, etc. or 1120*a*, 1120*b*, 1120*c*, 1120*d*, 1120*e*, etc. Thus, although the physical environment depicted can show the connected devices as computers, such illustration is merely exemplary and the physical environment can alternatively be depicted or described comprising various digital devices such as PDAs, televisions, MP3 players, etc., any of which can employ a variety of wired and wireless services, software objects such as interfaces, COM objects, and the like.

There are a variety of systems, components, and network configurations that support distributed computing environments. For example, computing systems can be connected together by wired or wireless systems, by local networks or widely distributed networks. Currently, many of the networks are coupled to the Internet, which provides an infrastructure for widely distributed computing and encompasses many different networks. Any of the infrastructures can be used for exemplary communications made incident to optimization algorithms and processes according to the present innovation.

In home networking environments, there are at least four disparate network transport media that can each support a unique protocol, such as Power line, data (both wireless and wired), voice (e.g., telephone) and entertainment media. Most home control devices such as light switches and appliances can use power lines for connectivity. Data Services can enter the home as broadband (e.g., either DSL or Cable modem) and are accessible within the home using either wireless (e.g., HomeRF or 802.11A/B/G) or wired (e.g., Home PNA, Cat 5, Ethernet, even power line) connectivity. Voice traffic can enter the home either as wired (e.g., Cat 3) or wireless (e.g., cell phones) and can be distributed within the home using Cat 3 wiring. Entertainment media, or other graphical data, can enter the home either through satellite or cable and is typically distributed in the home using coaxial cable. IEEE 1394 and DVI are also digital interconnects for clusters of media devices. All of these network environments and others that can emerge, or already have emerged, as protocol standards can be interconnected to form a network, such as an intranet, that can be connected to the outside world by way of a wide area network, such as the Internet. In short, a variety of disparate sources exist for the storage and transmission of data, and consequently, any of the computing devices of the present innovation can share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 11, as an example, computers 1120a, 1120b, 1120c, 1120d, 1120e, etc. can be thought of as clients and computers 1110a, 1110b, etc. can be thought of as servers where servers 1110a, 1110b, etc. maintain the data that is then replicated to client computers 1120a, 1120b, 1120c, 1120d, 1120e, etc., although any computer can be considered a client, a server, or both, depending on the circumstances. Any of these computing devices can be processing data or requesting services or tasks that can implicate the optimization algorithms and processes in accordance with at least one generalized non-limiting embodiment.

A server is typically a remote computer system accessible over a remote or local network, such as the Internet or wireless network infrastructures. The client process can be active in a first computer system, and the server process can be active in a second computer system, communicating with one another over a communications medium, thus providing distributed functionality and allowing multiple clients to take advantage of the information-gathering capabilities of the server. Any software objects utilized pursuant to the optimization algorithms and processes of at least one generalized non-limiting embodiment can be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) can be coupled to one another via TCP/IP connection(s) for high-capacity communication.

Thus, FIG. 11 illustrates an exemplary networked or distributed environment, with server(s) in communication with client computer (s) via a network/bus, in which the herein described echoing or supporting one SFN with another SFN can be employed. In more: detail, a number of servers 1110a, 1110b, etc. are interconnected via a communications network/bus 1140, which can be a LAN, WAN, intranet, GSM network, the Internet, etc., with a number of client or remote computing devices 1120a, 1120b, 1120c, 1120d, 1120e, etc., such as a portable computer, handheld computer thin client, networked appliance, or other device, such as a VCR, TV, oven, light, heater and the like in accordance with the present innovation. It is thus contemplated that the present innovation can apply to any computing device in connection with which it is desirable to communicate data over a network.

In a network environment in which the communications network/bus 1140 is the Internet, for example, the servers 1110a, 1110b, etc. can be Web servers with which the clients 1120a, 1120b, 1120c, 1120d, 1120e, etc. communicate via any of a number of known protocols such as HTTP. Servers 1110a, 1110b, etc. can also serve as clients 1120a, 1120b, 1120c, 1120d, 1120e, etc., as can be characteristic of a distributed computing environment.

As mentioned, communications can be wired or wireless, or a combination, where appropriate. Client devices 1120a, 1120b, 1120c, 1120d, 1120e, etc. can or cannot communicate via communications network/bus 1140, and can have independent communications associated therewith. For example, in the case of a TV or VCR, there can or cannot be a networked aspect to the control thereof. Each client computer 1120a, 1120b, 1120c, 1120d, 1120e, etc. and server computer 1110a, 1110b, etc. can be equipped with various application program modules or objects 1135a, 1135b, 1135c, etc. and with connections or access to various types of storage elements or objects, across which files or data streams can be stored or to which portion(s) of files or data streams can be downloaded, transmitted or migrated. Any one or more of computers 1110a, 11110b, 1120a, 1120b, 1120c, 1120d, 1120e, etc. can be responsible for the maintenance and updating of a database 1130 or other storage element, such as a database or memory 1130 for storing data processed or saved according to at least one generalized non-limiting embodiment. Thus, the present innovation can be utilized in a computer network environment having client computers 1120a, 1120b, 1120c, 1120d, 1120e, etc. that can access and interact with a computer network/bus 1140 and server computers 1110a, 1110b, etc. that can interact with client computers 1120a, 1120b, 1120c, 1120d, 1120e, etc. and other like devices, and databases 1130.

Exemplary Computing Device

As mentioned, the innovation applies to any device wherein it can be desirable to communicate data, e.g., to a mobile device. It should be understood, therefore, that handheld, portable and other computing devices and computing objects of all kinds are contemplated for use in connection with the present innovation, i.e., anywhere that a device can communicate data or otherwise receive, process or store data. Accordingly, the below general purpose remote computer described below in FIG. 11 is but one example, and the present innovation can be implemented with any client having network/bus interoperability and interaction. Thus, the present innovation can be implemented in an environment of networked hosted services in which very little or minimal client resources are implicated, e.g., a networked environment in which the client device serves merely as an interface to the network/bus, such as an object placed in an appliance.

Although not required, at least one generalized non-limiting embodiment can partly be implemented via an operating system, for use by a developer of services for a device or object, and/or included within application software that operates in connection with the component(s) of at least one generalized non-limiting embodiment. Software can be described in the general context of computer executable instructions, such as program modules, being executed by one or more computers, such as client workstations, servers, or other devices. Those skilled in the art will appreciate that the innovation can be practiced with other computer system configurations and protocols.

Figure 12:
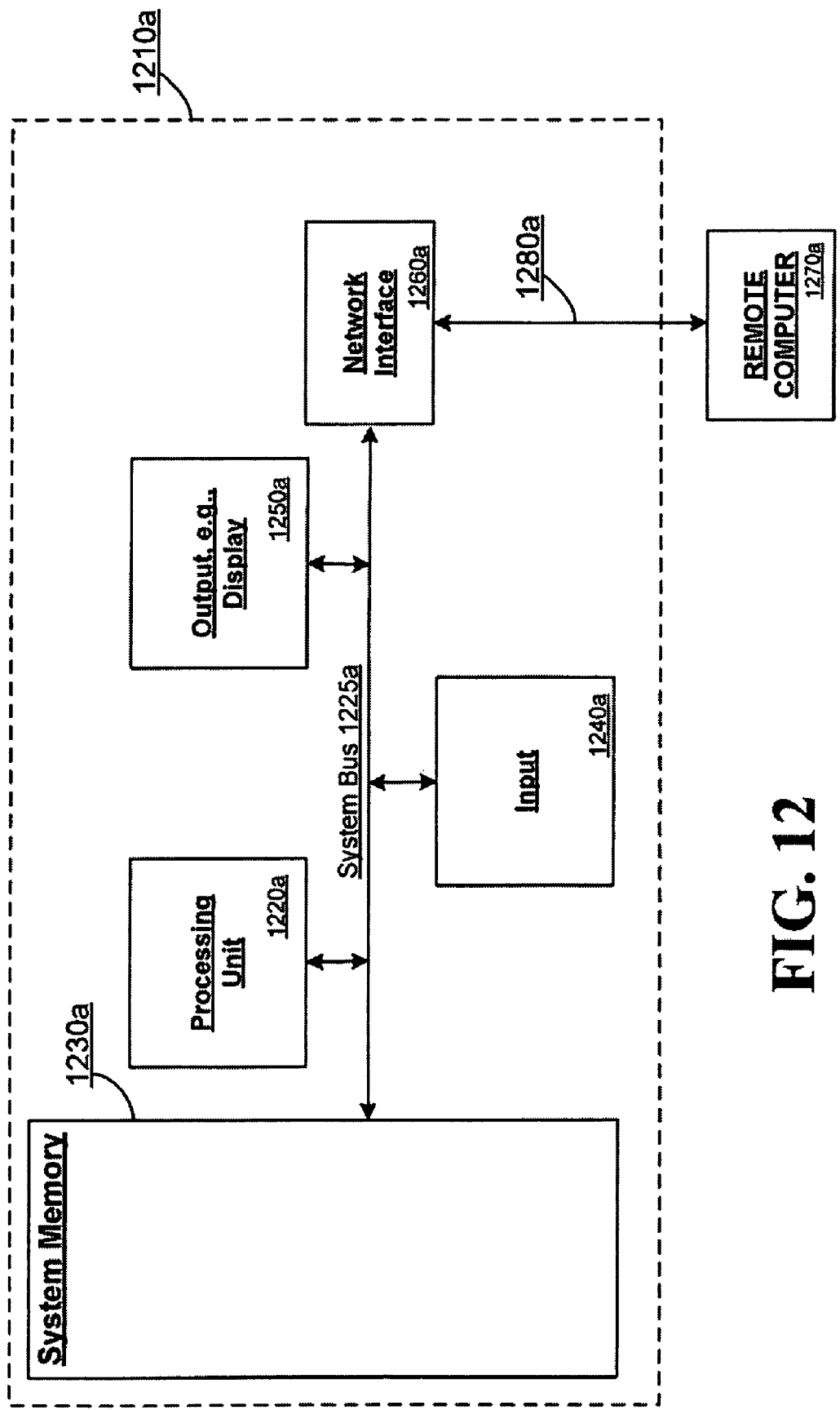
FIG. 12, an exemplary remote device for implementing at least one generalized non-limiting embodiment includes a general purpose computing device in the form of a computer in accordance with one or more aspects.

FIG. 12 thus illustrates an example of a suitable computing system environment 1200a in which the innovation can be implemented, although as made clear above, the computing system environment 1200a is only one example of a suitable computing environment and is not intended to suggest any limitation as to the scope of use or functionality of the innovation. Neither should the computing environment 1200a be interpreted as having any dependency or requirement relating to any one or combination of components illustrated in the exemplary operating environment 1200a.

With reference to FIG. 12, an exemplary remote device for implementing at least one generalized non-limiting embodiment includes a general purpose computing device in the form of a computer 1210a. Components of computer 1210a can include, but are not limited to, a processing unit 1220a, a system memory 1230a, and a system bus 1225a that couples various system components including the system memory to the processing unit 1220a. The system bus 1225a can be any of several types of bus structures including a memory bus or memory controller, a peripheral bus, and a local bus using any of a variety of bus architectures.

Computer 1210a typically includes a variety of computer readable media. Computer readable media can be any available media that can be accessed by computer 1210a. By way of example, and not limitation, computer readable media can comprise computer storage media and communication media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1210a. Communication media typically embodies computer readable instructions, data structures, program modules, or other data in a modulated data signal such as a carrier wave or other transport mechanism and includes any information delivery media.

The system memory 1230a can include computer storage media in the form of volatile and/or non-volatile memory such as read only memory (ROM) and/or random access memory (RAM). A basic input/output system (BIOS), containing the basic routines that help to transfer information between elements within computer 1210a, such as during start-up, can be stored in memory 1230a. Memory 1230a typically also contains data and/or program modules that are immediately accessible to and/or presently being operated on by processing unit 1220a. By way of example, and not limitation, memory 1230a can also include an operating system, application programs, other program modules, and program data.

The computer 1210a can also include other removable/non-removable, volatile/non-volatile computer storage media. For example, computer 1210a could include a hard disk drive that reads from or writes to non-removable, non-volatile magnetic media, a magnetic disk drive that reads from or writes to a removable, non-volatile magnetic disk, and/or an optical disk drive that reads from or writes to a removable, non-volatile optical disk, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state: ROM and the like. A hard disk drive is typically connected to the system bus 1225a through a non-removable memory interface such as an interface, and a magnetic disk drive or optical disk drive is typically connected to the system bus 1225a by a removable memory interface, such as an interface.

A user can enter commands and information into the computer 1210a through input devices such as a keyboard and pointing device, commonly referred to as a mouse, trackball or touch pad. Other input devices can include a microphone, joystick, game pad, satellite dish, scanner, or the like. These and other input devices are often connected to the processing unit 1220a through user input 1240a and associated interface(s) that are coupled to the system bus 1225a, but can be connected by other interface and bus structures, such as a parallel port, game port or a universal serial bus (USB). A graphics subsystem can also be connected to the system bus 1225a. A monitor or other type of display device is also connected to the system bus 1225a via an interface, such as output interface 1250a, which can in turn communicate with video memory. In addition to a monitor, computers can also include other peripheral output devices such as speakers and a printer, which can be connected through output interface 1250a.

The computer 1210a can operate in a networked or distributed environment using logical connections to one or more other remote computers, such as remote computer 1270a, which can in turn have media capabilities different from device 1210a. The remote computer 1270a can be a personal computer, a server, a router, a network PC, a peer device or other common network node, or any other remote media consumption or transmission device, and can include any or all of the elements described above relative to the computer 1210a. The logical connections depicted in FIG. 12 include a network 1280a, such local area network (LAN) or a wide area network (WAN), but can also include other networks/buses. Such networking environments are commonplace in homes, offices, enterprise-wide computer networks, intranets, and the Internet.

When used in a LAN networking environment, the computer 1210a is connected to the LAN 1280a through a network interface or adapter. When used in a WAN networking environment, the computer 1210a typically includes a communications component, such as a modem, or other means for establishing communications over the WAN, such as the Internet. A communications component, such as a modem, which can be internal or external, can be connected to the system bus 1225a via the user input interface of input 1240a, or other appropriate mechanism. In a networked environment, program modules depicted relative to the computer 1210a, or portions thereof, can be stored in a remote memory storage device. It will be appreciated that the network connections shown and described are exemplary and other means of establishing a communications link between the computers can be used.

Figure 13:
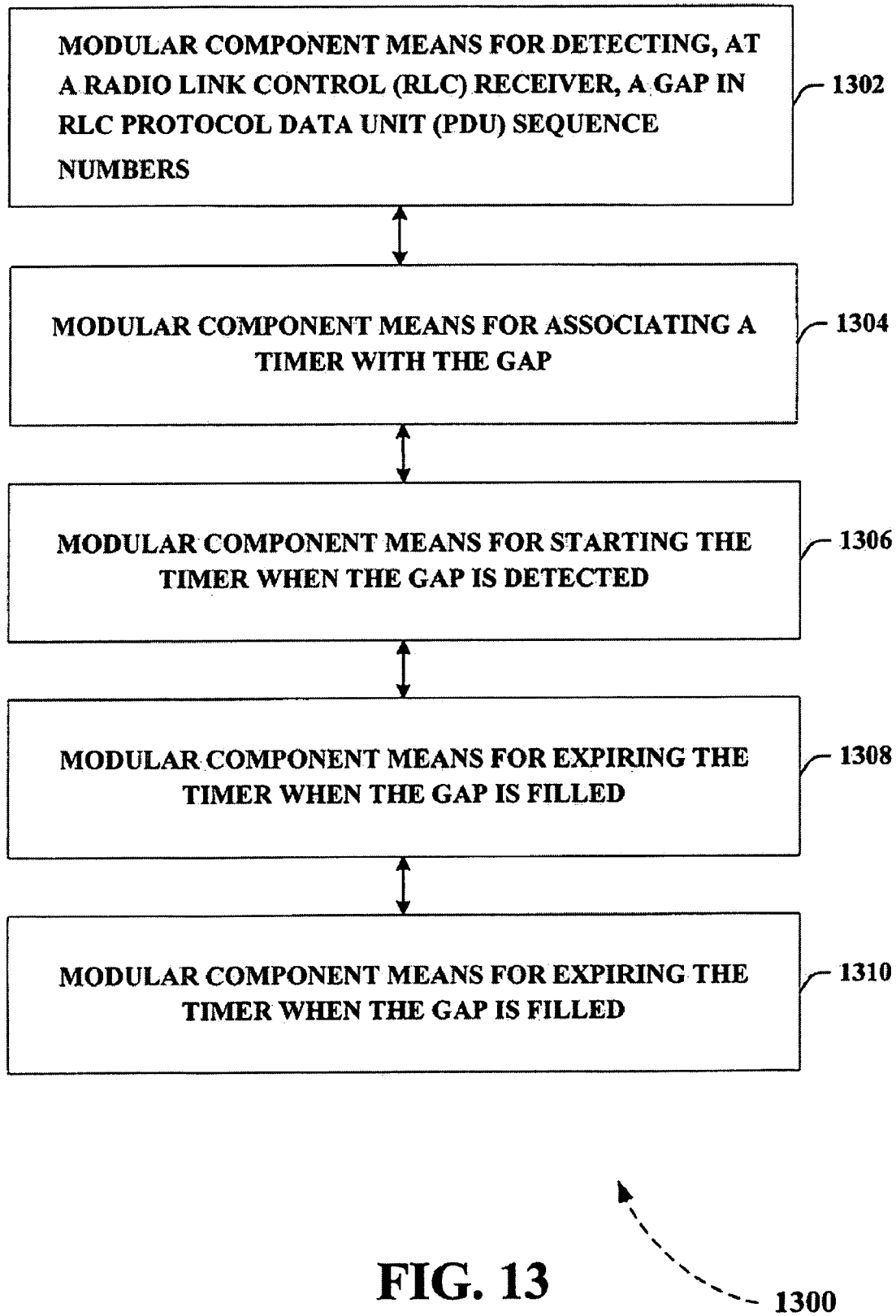
FIG. 13 illustrates an apparatus operable in a wireless communication system, the apparatus includes means for detecting, at a Radio Link Control (RLC) receiver, a gap in RLC Protocol Data Unit (PDU) sequence numbers, means for associating a timer with the gap, and means for starting the timer when the gap is detected.

FIG. 13 illustrates an apparatus 1300 operable in a wireless communication system, the apparatus includes modular component means 1302 for detecting, at a Radio Link Control (RLC) receiver, a gap in RLC Protocol Data Unit (PDU) sequence numbers, modular component means 1304 for associating a timer with the gap, and modular component means 1306 for starting the timer when the gap is detected. The apparatus can include modular component means 1308 for expiring the timer when the gap is filled. The apparatus can include modular component means 1310 for expiring the timer when a fixed time value is reached. The fixed time value can be adjusted based on a delay requirement.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications, and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method used in a wireless communication system, comprising:
sending to a receiving device from a transmitting device an indication of a Radio Link Control (RLC) re-transmission scheme selected from a plurality of RLC re-transmission schemes; and
using the indicated RLC re-transmission scheme at the transmitting device, wherein the plurality of re-transmission schemes include a receiver side scheme and a transmitter side scheme;
wherein the receiver side scheme includes,
detecting, at the receiver, a gap in RLC Protocol Data Unit (PDU) sequence numbers;
associating a timer with the gap; and
starting the timer when the gap is detected;
and the transmitter side scheme includes,
detecting a gap in a RLC PDU sequence;
monitoring all HARQ channels for a period of time to determine if a predetermined bit has changed; and
determining if a transmission is lost.

2. A method used in a wireless communication system, the method comprising:
receiving, at a receiving device, an indication of a Radio Link Control (RLC) re-transmission scheme selected from a plurality of RLC re-transmission schemes;
using the indicated RLC re-transmission scheme in the receiving device;
wherein the plurality of re-transmission schemes include a receiver side scheme and a transmitter side scheme;
wherein the receiver side scheme includes,
detecting, at the receiver, a gap in RLC Protocol Data Unit (PDU) sequence numbers;
associating a timer with the gap; and
starting the timer when the gap is detected;
and the transmitter side scheme includes,
detecting a gap in a RLC PDU sequence;
monitoring all HARQ channels for a period of time to determine if a predetermined bit has changed; and
determining if a transmission is lost.

3. An apparatus used in a wireless communication system, the apparatus comprising:
means for receiving, at a receiving device, an indication of a Radio Link Control (RLC) re-transmission scheme selected from a plurality of RLC re-transmission schemes; and
means for using the indicated RLC re-transmission scheme in the receiving device;
wherein the plurality of re-transmission schemes include a receiver side scheme and a transmitter side scheme;
wherein the receiver side scheme includes,
detecting, at the receiver, a gap in RLC Protocol Data Unit (PDU) sequence numbers;
associating a timer with the gap; and
starting the timer when the gap is detected;
and the transmitter side scheme includes,
detecting a gap in a RLC PDU sequence;
monitoring all HARQ channels for a period of time to determine if a predetermined bit has changed; and
determining if a transmission is lost.

4. A wireless communication system, comprising:
a memory; and
at least one processor coupled to the memory and configured:
to receive, at a receiving device, an indication of a Radio Link Control (RLC) re-transmission scheme selected from a plurality of RLC re-transmission schemes; and
to use the indicated RLC re-transmission scheme in the receiving device;
wherein the plurality of re-transmission schemes include a receiver side scheme and a transmitter side scheme;
wherein the receiver side scheme includes,
detecting, at the receiver, a gap in RLC Protocol Data Unit (PDU) sequence numbers;
associating a timer with the gap; and
starting the timer when the gap is detected;
and the transmitter side scheme includes,
detecting a gap in a RLC PDU sequence;
monitoring all HARQ channels for a period of time to determine if a predetermined bit has changed; and
determining if a transmission is lost.

5. A computer program product configured for wireless communications in a wireless network, the computer program product comprising:
a non-transitory computer-readable medium having program code recorded thereon, the program code comprising:
program code to receive, at a receiving device, an indication of a Radio Link Control (RLC) re-transmission scheme selected from a plurality of RLC re-transmission schemes; and
program code to use the indicated RLC re-transmission scheme in the receiving device;
wherein the plurality of re-transmission schemes include a receiver side scheme and a transmitter side scheme;
wherein the receiver side scheme includes,
detecting, at the receiver, a gap in RLC Protocol Data Unit (PDU) sequence numbers;
associating a timer with the gap; and
starting the timer when the gap is detected;
and the transmitter side scheme includes,
detecting a gap in a RLC PDU sequence;
monitoring all HARQ channels for a period of time to determine if a predetermined bit has changed; and
determining if a transmission is lost.

6. An apparatus used in a wireless communication system, comprising:
means for sending to a receiving device from a transmitting device an indication of a Radio Link Control (RLC) re-transmission scheme selected from a plurality of RLC re-transmission schemes; and
means for using the indicated RLC re-transmission scheme at the transmitting device;
wherein the plurality of re-transmission schemes include a receiver side scheme and a transmitter side scheme;
wherein the receiver side scheme includes,
detecting, at the receiver, a gap in RLC Protocol Data Unit (PDU) sequence numbers;
associating a timer with the gap; and
starting the timer when the gap is detected;
and the transmitter side scheme includes,
detecting a gap in a RLC PDU sequence;
monitoring all HARQ channels for a period of time to determine if a predetermined bit has changed; and
determining if a transmission is lost.

7. An apparatus used in a wireless communication system, comprising:
a memory; and
at least one processor coupled to the memory, and configured:
to send to a receiving device from a transmitting device an indication of a Radio Link Control (RLC) re-transmission scheme selected from a plurality of RLC re-transmission schemes; and to use the indicated RLC re-transmission scheme at the transmitting device;
wherein the plurality of re-transmission schemes include a receiver side scheme and a transmitter side scheme;
wherein the receiver side scheme includes,
   detecting, at the receiver, a gap in RLC Protocol Data Unit (PDU) sequence numbers;
   associating a timer with the gap; and
   starting the timer when the gap is detected;
and the transmitter side scheme includes,
   detecting a gap in a RLC PDU sequence;
   monitoring all HARQ channels for a period of time to determine if a predetermined bit has changed; and
   determining if a transmission is lost.

8. A computer program product configured for wireless communications in a wireless network, the computer program product comprising:
   a non-transitory computer-readable medium having program code recorded thereon, the program code comprising:
      program code to send to a receiving device from a transmitting device an indication of a Radio Link Control (RLC) re-transmission scheme selected from a plurality of RLC re-transmission schemes; and
      program code to use the indicated RLC re-transmission scheme at the transmitting device;
   wherein the plurality of re-transmission schemes include a receiver side scheme and a transmitter side scheme;
   wherein the receiver side scheme includes,
      detecting, at the receiver, a gap in RLC Protocol Data Unit (PDU) sequence numbers;
      associating a timer with the gap; and
      starting the timer when the gap is detected;
   and the transmitter side scheme includes,
      detecting a gap in a RLC PDU sequence;
      monitoring all HARQ channels for a period of time to determine if a predetermined bit has changed; and
   determining if a transmission is lost.

* * * * *